Figure 1:
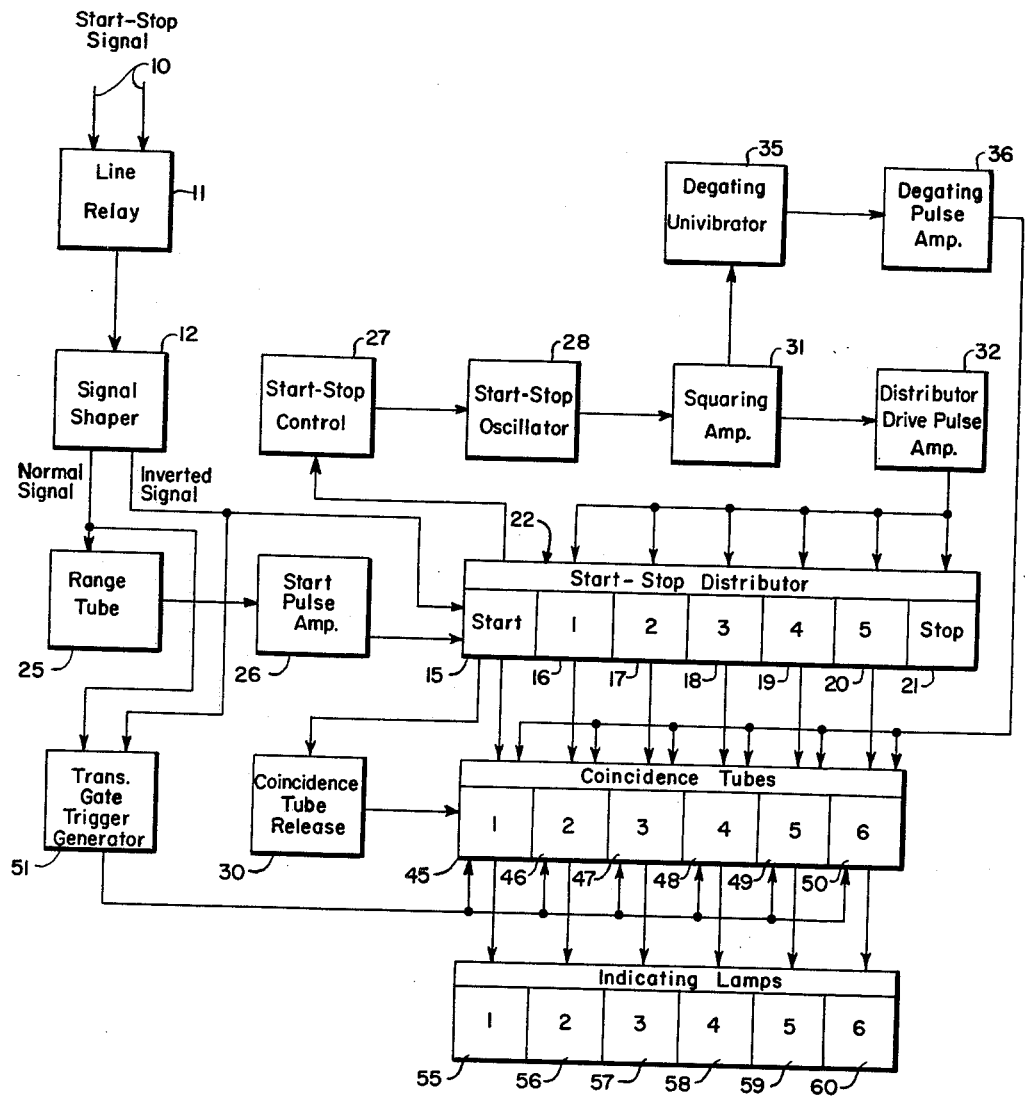

July 17, 1962 R. D. SLAYTON 3,045,061
SIGNAL DISTORTION INDICATOR
Filed Dec. 23, 1958 4 Sheets-Sheet 1

INVENTOR
RANSOM D. SLAYTON
BY R.C. Terry
ATTORNEY

INVENTOR
RANSOM D. SLAYTON

FIG. 2 | FIG. 3

INVENTOR
RANSOM D. SLAYTON
BY R.C. Terry
ATTORNEY

United States Patent Office 3,045,061
Patented July 17, 1962

---

3,045,061
SIGNAL DISTORTION INDICATOR
Ransom D. Slayton, Glenview, Ill., assignor to Teletype Corporation, Chicago, Ill., a corporation of Delaware
Filed Dec. 23, 1958, Ser. No. 782,511
6 Claims. (Cl. 178—69)

This invention relates to a signal distortion indicator and more particularly to apparatus for indicating distortion in individual impulses of a telegraph signal.

In the manufacture of telegraph apparatus, it is necessary to test the apparatus for such things as the accuracy of signals generated thereby. The testing of the signal is necessary at other times during the operation of the apparatus, and many indicating devices have been devised heretofore for testing a telegraph signal in order to determine whether or not distortion has been caused to the transitions between the impulses in the signal. For the most part, indicators have been devised which indicate whether or not distortion is present anywhere within the signal, and such indicators do not indicate which impulse in the signal is being distorted. Several devices have been devised which do indicate which impulses in the signal are distorted, but such devices are costly because they include mechanical instrumentalities or a cathode ray oscilloscope on which are displayed sweeps which correspond to the impulses in the signal.

It is an object of the present invention to provide a new and improved signal distortion indicator.

Another object of the invention is to provide new and improved apparatus for indicating distortion in individual impulses in a telegraph signal.

It is a further object of the invention to provide a signal distortion indicator which indicates any distortion in individual impulses in a telegraph signal and which is less expensive to construct and simpler to operate than indicators devised heretofore to perform this function.

With these and other objects in view, a signal distortion indicator for analyzing distortion in each impulse in a telegraph signal, embodying certain features of the invention, may include a distributor having a plurality of serially-connected stages associated with the impulses in the signal, a plurality of coincidence-sensing means, means controlled by the signal for driving the distributor stages sequentially such that each stage is operated for a time duration equal to the duration of a distortionless version of the impulse associated therewith, a first pulse generator operated by the distributor-driving means for generating a plurality of pulses which occur at the times of transitions between impulses in a distortionless signal, a second pulse generator operated by each transition in the signal for generating a plurality of pulses which occur at the times of the actual transitions between the impulses, means for applying an output voltage from each distributor stage and from the two pulse generators to one of the coincidence-sensing means and an indicator connected to each coincidence-sensing means and operable upon the non-coincidence of the voltages applied to such means.

More particularly, in the signal distortion indicator embodying the invention, a start-stop signal is applied to the indicator, and the signal renders a start-stop oscillator operable to generate a series of pulses which drive a start-stop distributor. A plurality of coincidence tubes is provided, and an output from each stage of the distributor is applied to a first grid of one of the coincidence tubes. The start-stop oscillator also operates a de-gating univibrator which provides a pulse over a duration of time equal to the permissible variation on each side of the time that a transition should occur in a distortionless signal. Such pulses are applied to a second grid of each of the coincidence tubes. The input signal is also applied to a trigger generator which provides an output pulse each time a transition actually occurs in the signal, and such pulses are applied to the first of the abovementioned grids in the coincidence tubes. Should there be coincidence among all three inputs to the grids of any of the coincidence tubes, an indicating lamp associated therewith will not be energized. However, should the pulse from the trigger generator, which corresponds to an actual transition in the signal, not occur at the time that the other two pulses are being applied to the associated coincidence tube, the coincidence tube will sense this lack of coincidence and energize an indicating lamp associated therewith. A registering counter can also be operated to provide a permanent record of the occurrence of the condition. With this structure, each impulse of the incoming signal is analyzed to determine whether or not distortion is present therein. Instrumentalities are also provided for determining the precise amount of distortion in the signal. Consequently, the structure which generates the particular signal element which is at fault can be checked so that rapid corrective action can be taken.

Figure 2:
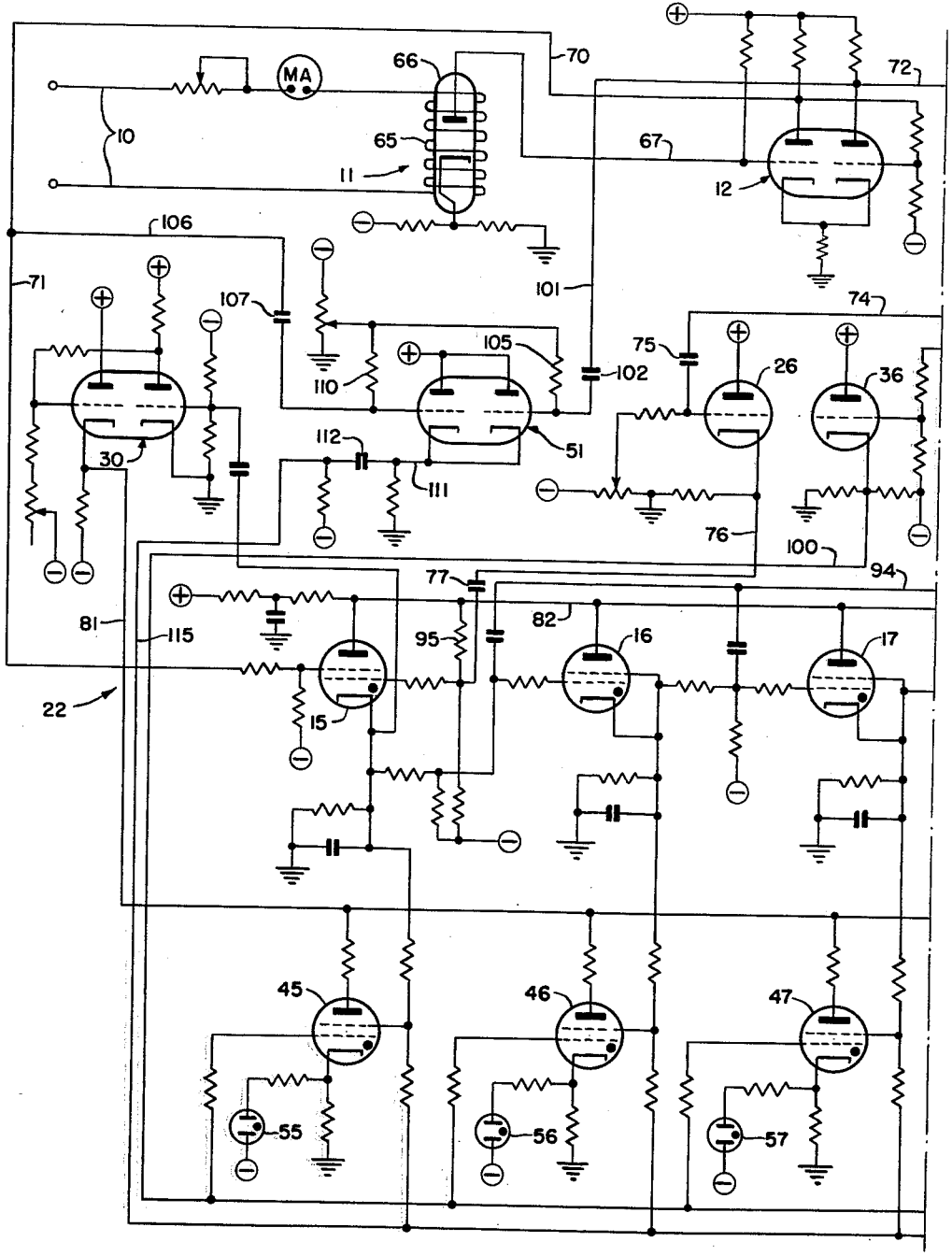
Figures 3, 4:
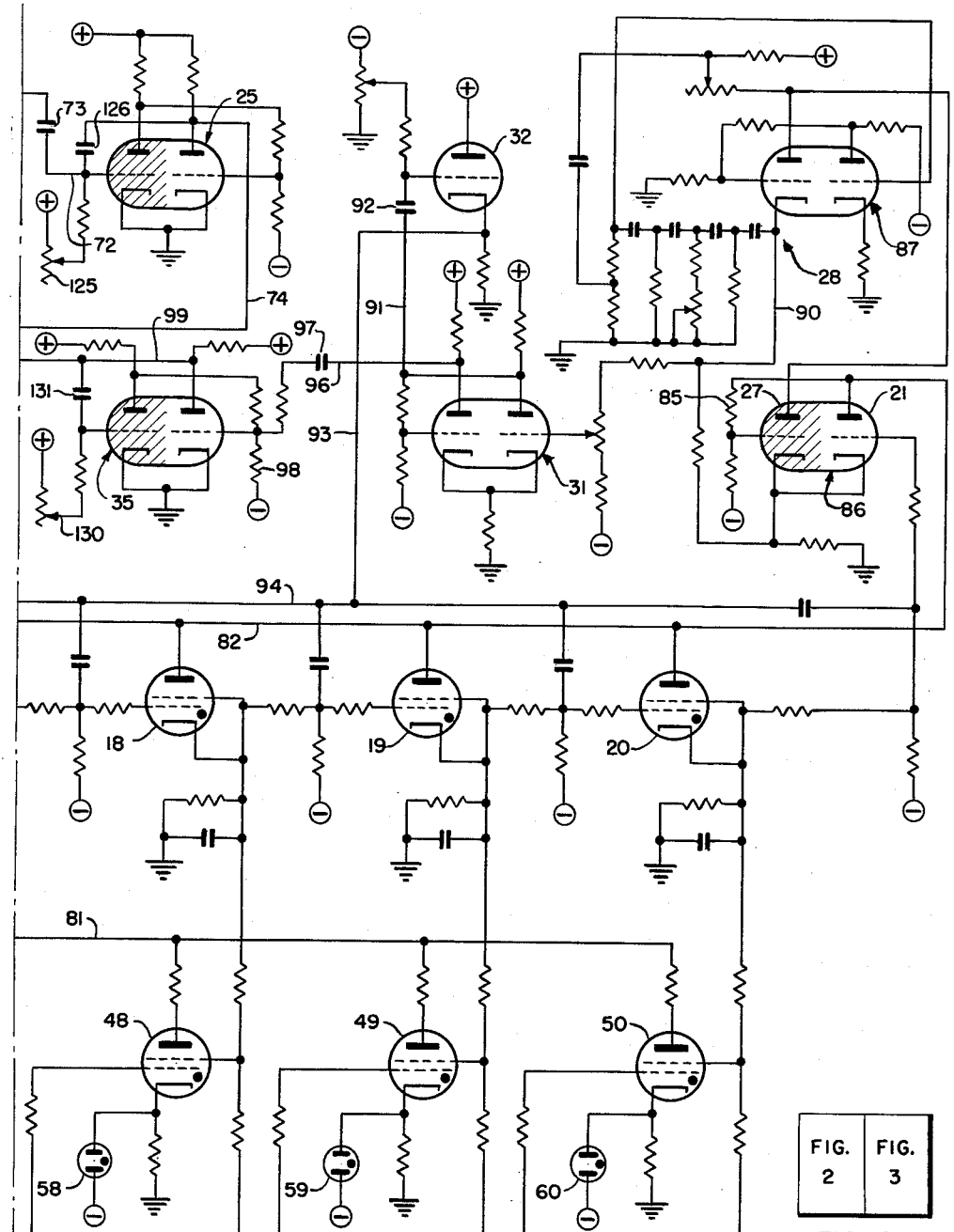
Figure 5:
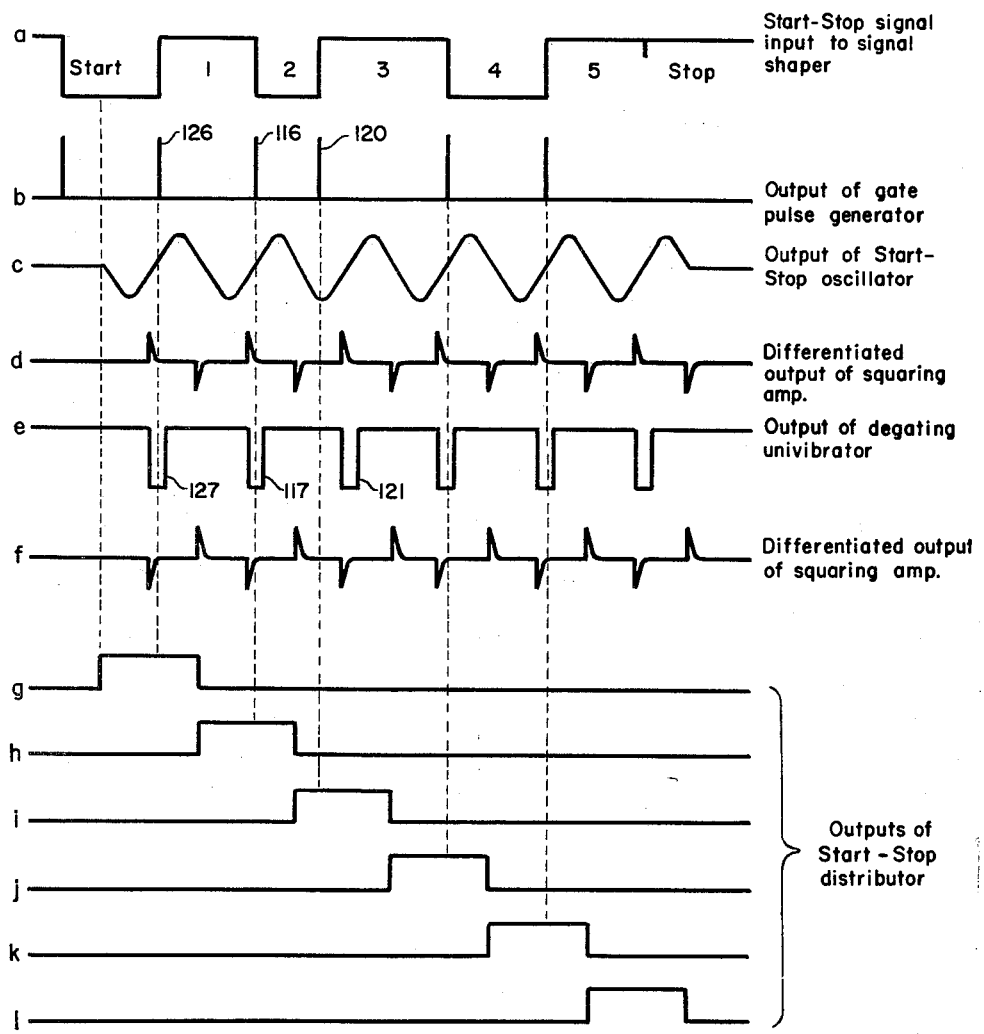

Other objects and advantages of the present invention will be apparent from the following, detailed description when considered in conjunction with the accompanying drawings wherein:

FIG. 1 is a block diagram of a signal distortion indicator embodying the present invention;

FIGS. 2 and 3, when assembled in the manner depicted in FIG. 4, form a schematic diagram of the signal distortion indicator shown in the block diagram of FIG. 1 and embodying the principles of the present invention; and FIG. 5 shows a plurality of waveforms of potentials which appear at particular points in the schematic diagram shown in FIGS. 2 and 3.

Referring now to the block diagram of FIG. 1, telegraph signals of the start-stop type and the impulses of which are to be analyzed, are impressed on input leads 10—10 and are applied to a line relay 11. The line relay 11 isolates the signal distortion indicator from the signal line, and the telegraph signals are coupled therefrom to a signal shaper 12 from which two outputs, one corresponding in wave form to the received telegraph signals and a second the inverted version thereof, are taken. The inverted version of the first impulse in the signal, the start impulse, is applied to a start tube 15 to condition the start tube 15 for operation. The start tube 15 and a plurality of serially-connected tubes 16 to 21, inclusive, form a distributor 22. The output from the signal shaper 12 which corresponds to the telegraph signal is applied to a range tube 25 which is a univibrator or monostable flip-flop. This circuit has a stable condition in which it normally operates and an unstable condition which can exist for a predetermined time. The application of the output of the signal shaper 12 places the range tube 25 in its unstable state for such a time which is made equal to approximately one-half an impulse length, and thereafter a sharp positive pulse is applied therefrom and through a start pulse amplifier 26 to the previously-conditioned start tube 15, activating the start tube. The activation of the start tube 15 initiates the operation of the start-stop distributor 22 and the drive circuits therefor. Such drive circuits include a start-stop oscillator control tube 27 which is operated by the start tube 15 and which controls the operation of a start-stop oscillator 28. The activation of the start tube 15 also operates a coincidence tube release circuit 30 for a purpose which will be described more fully hereinbelow.

The oscillator 28, when operated by the oscillator control tube 27, generates a sine wave output which has a period equal to the length of a distortionless impulse of the incoming signal. An output of the oscillator 28 is applied to a squaring amplifier 31 which forms a series of pulses of square waveform that perform two functions. First, output pulses of the squaring amplifier 31 are applied to and control a distributor drive pulse amplifier 32 which drives the distributor 22 by rendering the stages 16 to 21, inclusive, conductive successively for periods of time each of which is equal to the length of a distortionless impulse. Secondly, output pulses from the squaring amplifier 31 are applied to a de-gating univibrator 35 at a time that is approximately one-half an impulse period later than the application of the pulses from the squaring amplifier 31 to the distributor drive pulse amplifier 32. Like the range tube 25, the de-gating univibrator 35 is a monostable flip-flop which operates in its unstable state for a brief time interval which may, as will be described more fully hereinafter, be adjusted to a maximum that is equal to the length of a signal impulse period. Consequently, since the de-gating univibrator 35 is started one-half impulse after the initiation of operation of the distributor 22 by the range tube 25, and since this action was started by the range tube 25 at the center of the start element, the first pulse therefrom will coincide with the end of the start impulse or the beginning of the No. 1 impulse of the telegraph signal, and it will occur just prior to the instant that the transition between the start impulse and the No. 1 impulse should occur. The output of the de-gating univibrator 35 is applied through a de-gating pulse amplifier 36 to first control electrodes of a plurality of coincidence tubes 45 to 50, inclusive. Also applied to second control electrodes of the coincidence tubes 45 to 50, inclusive, are outputs from the stages 15 to 20, inclusive, of the distributor 22.

Finally, a third pulse is applied to the second control grids of the coincidence tubes 45 to 50, inclusive, from a transition gate trigger generator 51 to which are applied both the normal and the inverted signals from the signal shaper 12. The output of the transition gate trigger generator 51 is a momentary positive pulse which is generated upon the occurrence of any transition, either positive (space-to-mark) or negative (mark-to-space), in the start-stop signal. Consequently, a positive pulse is applied from the transition gate trigger generator 51 to the coincidence tubes 45 to 50, inclusive, upon the occurrence of each transition in the signal. If the three input pulses to the coincidence tubes 45 to 50, inclusive, occur simultaneously, with the momentary pulse from the trigger generator 51 falling within the pulse output of the de-gating univibrator 35, no output is derived from the coincidence tubes, because the output from the de-gating pulse amplifier 36 prevents them from conducting. If, however, an actual transition in the signal has occurred at an improper time, partially or completely falling outside of the pulse output of the de-gating univibrator 35, no de-gating pulse will be applied to the associated coincidence tube when the corresponding pulse from the transition gate trigger generator 51 is applied to such coincidence tube. In this case, the non-coincidence of these pulses is sensed by the associated coincidence tube, and an associated indicating lamp of a group of such lamps 55 to 60, inclusive, is energized. Since the distributor stages 16 to 21, inclusive, operate successively, it can be seen that each impulse in the start-stop signal, including the start impulse and five intelligence impulses, is analyzed by the coincidence tubes 45 to 50, inclusive, and any distortion in any of these impulses is indicated by the associated indicating lamp. Also, as will be described more fully hereinbelow, the exact amount of distortion in the impulse can be determined by varying the periods of the de-gating univibrator 35 and/or the range tube 25 until the indicating lamp is extinguished.

Referring now to the schematic diagram shown in FIGS. 2 and 3, a start-stop signal to be analyzed is applied across the input leads 10—10 and a coil 65 which, upon being energized by a marking impulse, applies a magnetic field to a diode 66, the coil 65 and the diode 66 forming the line relay 11. This type of line relay is old in the art, and it is provided to isolate the apparatus to which it is connected from the signal line. For the purposes of the present invention, it is only necessary to state that the telegraph signals appearing on the input leads 10—10 are reproduced with marking impulses appearing as positive voltages and spacing impulses as negative voltages at the anode of the magnetic diode 66, and these potentials are impressed on a lead 67. Since a start impulse precedes each character in the signal, assume that such a spacing or no-current impulse is impressed on the leads 10—10 and appears as a negative potential on the anode of the diode 66 and on the lead 67. This spacing impulse is applied to the left-hand grid of a twin triode which forms the signal shaper tube 12. The two sides of the tube 12 are connected as a Schmitt trigger circuit, which is described in the text on pages 57 and 58 accompanying FIG. 34 of a publication by O. S. Puckle, entitled "Time Bases" and dated March 1943. In this circuit, when one side thereof is conducting, the other side is nonconducting, and the changes are abrupt, so that the effect is that of a squaring amplifier. Consequently, the spacing impulse impressed on the lead 67 renders the left-hand side of the tube 12 nonconductive and the right-hand side thereof conductive.

When the left-hand side of the tube 12 is rendered nonconductive, its anode potential increases, and such an increase in potential persists for the length of the start impulse. Consequently, a potential appears on the anode of the left-hand side of the tube 12 which is inverted with respect to the potential which represents the incoming signal on the anode of the diode 66. This inverted signal is applied over leads 70 and 71 to the screen grid of the start tube 15 to condition this tube for conduction. When the right-hand side of the signal shaper tube 12 was rendered conductive, its anode potential dropped so that the potential appearing on the anode of the right-hand side of the tube 12 is of similar wave form as the incoming signal. This potential is applied over a lead 72 and through a capacitor 73 to the grid of the left-hand side of the range tube 25 which is connected as a univibrator. As shown in FIG. 3, the left-hand side of the range tube 25 is normally conducting, and the right-hand side thereof is normally nonconductive. The negative pulse resulting from the initiation of the start impulse being applied over the lead 72 and to the grid of the left-hand side of the range tube 25 renders this side nonconductive, and the tube 25 remains in this unstable state for a predetermined time to be determined by the resistive-capacitive components in the circuit.

When the left-hand side of the tube 25 is rendered nonconductive, the right-hand side is rendered conductive for the same predetermined time, and a negative pulse appears on the anode of the right-hand side and is applied over a lead 74 and through a differentiating capacitor 75 to the control grid of the start pulse amplifier 26. This amplifier is connected as a cathode follower with its control grid biased negatively so that it is normally nonconducting. Consequently, the momentary negative pulse impressed through the differentiating capacitor 75 to the control grid of the tube 26 at the instant that the negative pulse is first applied to the lead 74 has no effect on the tube 26. When, however, the univibrator range tube 25 returns to its original condition at the end of its predetermined operating interval, the differentiated positive potential transition through the capacitor 75 produces a momentary positive pulse at the grid of the tube 26, and this positive pulse renders the tube 26 conductive. Consequently, a positive pulse appears on the grid of the cathode follower 26 and is applied over a lead 76 and through a capacitor 77 to the grid of the start tube 15 in the distributor 22, rendering the start tube conductive. As stated hereinabove, the rendering conductive of the start tube 15 performs two functions: it renders nonconductive any of the coincidence tubes 45 to 50, inclusive, that may be conducting and initiates operation of the start-stop oscillator 28. With respect to the coincidence tubes 45 to 50, inclusive, when the start tube 15 is rendered conductive, its cathode potential rises, and this increase in potential is applied to the grid of the right-hand side of the coincidence release tube 30, rendering this side conductive. When the right-hand side of the tube 30 is rendered conductive, the left-hand side thereof is rendered nonconductive, a decreased potential appears on the cathode of this latter side, and this decrease in potential is impressed on a lead 81 which is connected commonly to the anodes of all of the coincidence tubes 45 to 50, inclusive. This decreased potential on the anodes of the coincidence tubes renders nonconductive any of the tubes which may be conducting from a previous operation.

With respect to the initiation of operation of the start-stop oscillator 28 when the start tube 15 is rendered conductive, the decreased potential on its anode is impressed on a lead 82 which is connected commonly to the anodes of the distributor tubes 15 to 21, inclusive, and through a resistor 85, to the grid of the oscillator control tube 27. It will be noted that the start tube 15 and the distributor tubes 16 to 20, inclusive (associated with the No. 1 to No. 5 impulses, inclusive, and respectively, of the incoming signal), are gas tubes of the thyratron type, and the last stage of the distributor 22, the tube 21 (associated with the stop impulse of the incoming signal), is a triode vacuum tube. Also, the stop tube 21 is connected in a trigger circuit with the oscillator control tube 27, and both of these tubes may be included in a single envelope, as designated at 86 in FIG. 3. Consequently, when the start tube 15 conducts, the decreased anode potential thereof affects only the normally-conducting oscillator control tube 27 which is cut off thereby to render the oscillator 28 effective. No detailed description of the oscillator 28 nor the details of its operation will be given at this time since the same may be had by reference to United States Patent No. 2,373,737, to M. Artzt, granted April 17, 1945, wherein a complete description may be found. Also, a description of the particular structure including the oscillator control tube 27 for controlling the oscillator 28 may be had by reference to United States Patent No. 2,536,578, to R. D. Slayton, granted January 2, 1951. For the purposes of the present invention, it is only necessary to state that when the left-hand side of the tube 86, the oscillator control tube 27, is in its normally-conducting condition, the decreased anode potential thereof renders the oscillator 28 ineffective. Then, when the left-hand side of the oscillator control tube 27 is cut-off, the oscillator 28 is rendered operative, and a sine wave output is derived from the cathode of the left-hand side of an oscillator tube 87.

The sine wave output of the oscillator 28 is connected by a lead 90 to the grid of the right-hand side of the squaring amplifier 31, a duo-triode tube connected as a Schmitt trigger circuit. Consequently, the two sides of the squaring amplifier 31 conduct alternately, and inverted outputs are taken from the anodes thereof. The output at the anode of the right-hand side of the squaring amplifier 31 is applied over a lead 91, is differentiated by a capacitor 92 and a resistor and is impressed on the grid of the distributor drive pulse amplifier tube 32. An output is taken from the cathode of this latter tube and is applied over a lead 93 and to a common lead 94 over which this pulse is applied to the control grids of all of the tubes 16 to 21, inclusive, in the distributor 22. As disclosed sufficiently in the above-identified Slayton patent, the distributor tubes 15 to 21, inclusive, are rendered conductive successively, and the frequency of the oscillator 28 is such that each of the distributor tubes 15 to 20, inclusive, is rendered conductive for a period equal to an impulse period.

Also, when the last tube, the stop tube 21, in the distributor 22 is rendered conductive, this tube, unlike the gas tubes 15 to 20, inclusive, will remain conductive only during the time that the pulse from the distributor pulse amplifier 32 is being applied to its grid. When it ceases, the stop tube 21 is again rendered nonconductive, and the increased anode potential thereof again places the oscillator control tube 27 in its normally-conductive state, thereby rendering the oscillator 28 ineffective until the receipt of a subsequent character. Further, during the interval that the distributor tubes 15 to 21, inclusive, were rendered conductive successively, their reduced common anode potential is applied through a resistor 95 to the control grid of the start tube 15, thereby preventing the start tube 15 from being rendered conductive by the operations of the range tube 25 which occur after each mark-to-space transition in the incoming signal. When the distributor 22 again comes to rest, the rise in common anode potential applied through the resistor 95 removes the biasing potential from the grid of the start tube 15 and primes the tube 15 for conduction upon the next operation of the range tube 25. This operation occurs upon the reception of the next start impulse on the input leads 10—10.

The square wave pulse which appears on the anode of the left-hand side of the squaring amplifier 31 is applied over a lead 96 and to the grid of the right-hand side of the de-gating univibrator 35. The left-hand side of the univibrator 35 is normally conductive, and when a positive pulse is applied to the grid of the right-hand side thereof, this latter side will be rendered conductive for a predetermined time depending upon the circuit constants, at which time the univibrator 35 will revert to its original, stable condition. Each time the left-hand side of the squaring amplifier 31 is rendered nonconductive, a positive pulse appears on the anode thereof, is differentiated by a capacitor 97 and a resistor 98 and is applied to the grid of the right-hand side of the univibrator 35, rendering this side conductive. After the above-described predetermined time, the right-hand side of the univibrator 35 will be rendered nonconductive again so that each positive, differentiated pulse which is applied to the grid of the right-hand side of the tube 35 will cause a corresponding negative pulse of predetermined length to appear on the anode of this side. This negative pulse is impressed over a lead 99 to the grid of the de-gating pulse amplifier 36, and a negative pulse appears on the cathode thereof. This latter negative pulse is impressed over a lead 100 and on the control grids of all of the coincidence tubes 45 to 50, inclusive. The period of the de-gating univibrator 35 is such that a negative pulse of predetermined width is applied to the control grids of the coincidence tubes 45 to 50, inclusive, during the time that each properly-positioned transition in the incoming signal should occur.

As described hereinabove, each of the distributor tubes 15 to 20, inclusive, is rendered conductive for a predetermined time, equal to an impulse period, and such tubes are rendered conductive successively. When any of these tubes is rendered conductive, a positive potential appears on its cathode, and such a potential is applied to the screen grid of the associated one of the coincidence tubes 45 to 50, inclusive. These positive potentials condition for conduction the tubes to which they are applied for the period of time during which they are applied to the screen grids of the coincidence tubes 45 to 50, inclusive. However, a negative pulse is applied to the control grids of each of the coincidence tubes 45 to 50, inclusive, during the time that a transition should occur in a distortionless signal. These negative pulses prevent the coincidence tubes 45 to 50, inclusive, from conducting if the actual signal transitions occur at their proper times. Pulses corresponding to the actual time of transition in the incoming signal are also applied to the control grids of the coincidence tubes 45 to 50, inclusive, from the transition gate trigger generator 51. As described hereinabove, signals which correspond to the incoming start-stop signals appear on the anode of the right-hand side of the signal shaper tube 12. These signals are impressed over a lead 101 and are differentiated by a capacitor 102 and a resistor 105, and the positive and negative potential spikes resulting therefrom are applied to the grid of the right-hand side of the transition gate trigger generator 51. Also, an inverted version of the incoming signals appears on the anode of the left-hand side of the signal shaper tube 12, and these signals are applied over the lead 70 and a lead 106, are differentiated by a capacitor 107 and a resistor 110 and are impressed on the grid of the left-hand side of the transition gate trigger generator 51.

The transition gate trigger generator 51 is a twin triode connected as a single cathode follower biased beyond cut-off, and since each transition in the incoming signal, whether positive or negative going, is represented by a positive potential spike and applied to either the left-hand or right-hand grids of the tube 51, each transition causes a sharp positive pulse at a common output cathode lead 111 of the tube 51. Consequently, these positive pulses occur each time an actual transition occurs in the incoming signal, and such positive pulses are sharpened further by a capacitor 112 and are applied over a lead 115 and to the screen grids of all of the coincidenle tubes 45 to 50, inclusive, simultaneously. If each of these transitions occurs at its proper time, a corresponding negative pulse from the de-gating univibrator 35 will be applied to the control grid of the associated coincidence tube so that conduction of the coincidence tube will be prevented. However, if a transition occurs in the incoming signal at a time when no negative pulse is being applied to the corresponding coincidence tube from the de-gating univibrator 35, the associated coincidence tube will be rendered conductive since the screen grid thereof is conditioned for conduction by an output from a corresponding stage of the distributor 22. When any of the coincidence tubes 45 to 50, inclusive, is rendered conductive, the neon lamp in its cathode circuit is energized to indicate that distortion is present in the individual impulse being analyzed.

From the above description, it can be seen that three conditions are necessary in order to fire a coincidence tube of the group of tubes 45 to 50, inclusive. These conditions include (1) that the control grids must not be held negative by a pulse from the de-gating univibrator 35, (2) that the associated distributor tube must apply screen grid conditioning potential thereto, and (3) that there must be a transition in the input signal to apply the sharp positive transition trigger pulse from the transition gate trigger generator 51 to the screen grid. The timing is such that the transitions in a perfect start-stop signal will occur in the center of the pulses from the de-gating univibrator 35 and the associated coincidence tube will not be fired. If the distortion in the start-stop signal causes a transition to occur either before or after the de-gating pulse, the coincidence tube will be fired and the associated neon lamp will be energized.

In order to explain the invention more completely, the relative timing of the various operations described hereinabove can be seen by referring to FIG. 5. It will be assumed that the start-stop signal shown in FIG. 5-a has marking bias in the No. 3 code impulse. As a result, the positive going transition related to the No. 3 impulse occurs prematurely so that the No. 2 impulse is shortened thereby. The wave form as shown in FIG. 5-b shows the sharp transition trigger pulses resulting from transitions in the line signals and appearing on the common cathode lead 111 of the transition gate trigger generator 51. These pulses are applied over the lead 115 to the screen grids of all of the coincidence tubes 45 to 50, inclusive.

The first transition in the start impulse, the negative going transition, is duplicated on the anode of the right-hand side of the signal shaper tube 12 and operates the range tube 25. As described hereinabove, the range tube 25 is a monostable flip-flop or univibrator, and its period is designed to be one-half an impulse period. Since the output pulse from the anode of the right-hand side of the range tube 25 is a positive pulse when the range tube returns to its initial condition as shown in FIG. 3, and since this positive pulse is differentiated by the capacitor 75, the positive pip therefrom, occurring at a time which is at the center of the start impulse, appears in the cathode of the start pulse amplifier 26 and renders the start tube 15 conductive at this time. As also described hereinabove, when the start tube 15 is rendered conductive, the oscillator control tube 27 is cut off, and the oscillator 28 is rendered effective. This occurs, as can be seen in FIG. 5-c at the center of the start impulse. Then, outputs from the oscillator 28 are squared in the squaring amplifier 31, and the anode potential of the left-hand side thereof is differentiated by the capacitor 97 and the resistor 98 and is applied to the de-gating univibrator 35. This differentiated signal being applied to the grid of the right-hand side of the de-gating univibrator 35 is shown in FIG. 5-d. Each positive going transition of the differentiated signal being applied to the grid of the right-hand side of the de-gating univibrator causes a negative pulse, of a length determined by the circuit constants of the univibrator 35, to appear on the anode thereof, and these pulses are shown in FIG. 5-e. These negative pulses are applied through the de-gating pulse amplifier 36 and to the control grid of the coincidence tubes 45 to 50, inclusive.

Meanwhile, the pulses at the right-hand anode of squaring amplifier 31 are differentiated by the capacitor 92 and resistor 93 and are applied through the distributor drive pulse amplifier 32 and to the control grids of tubes 16 to 21, inclusive, in the distributor 22, as shown in FIG. 5-f. As described in the Slayton patent, the positive ones of these pulses render the distributor stages conductive successively. The outputs of the distributor tubes 15 to 20, inclusive, are shown in FIGS. 5-g to 5-l, inclusive, and referring thereto, it will be seen that the start tube 15 (FIG. 5-g) is rendered conductive at the center of the start impulse being applied to the input leads 10—10. Also, the start tube remains conductive for a length of time equal to the time of an impulse of correct length. Further, referring to FIG. 5-e, it will be seen that a pulse is derived from the de-gating univibrator 35 at the center of each of the pulses shown in FIGS. 5-g to 5-l, inclusive. Therefore, as far as the transition between, for example, the No. 1 and the No. 2 impulses is concerned, this transition causes a pulse 116 (FIG. 5-b) to be applied from the transition gate trigger generator 51 to the screen grids of the coincidence tubes 45 to 50, inclusive. At this time, the distributor tube 16 is operating to place a further conditioning potential on only the screen grid of the coincidence tube 46. However, the coincidence tube 46 cannot conduct at this time since a pulse 117 (FIG. 5-e) is being applied to the control grid of the coincidence tube 46 from the de-gating pulse amplifier 36. This negative pulse prevents conduction of the coincidence tube 46 since the transition between the No. 1 and No. 2 impulses has occurred at its correct time.

As stated hereinabove, it is assumed that there is marking bias in the No. 3 impulse. Consequently, the incorrectly-positioned transition between the No. 2 and the No. 3 impulses results in the generation of a pulse 120 (FIG. 5-b) at the output of the transition gate trigger generator 51. At this time, the distributor tube 17 is conducting so that a conditioning potential is being applied to the screen grid of the associated coincidence tube 47. However, when the pulse 120 is applied to the screen grid of the coincidence tube 47, there is no negative pulse being applied thereto from the de-gating pulse amplifier 32. Stated in other words, the pulse 120 (FIG. 5-b) should occur at a time that a de-gating pulse 121

(FIG. 5–e) occurs, but, because of the marking bias in the No. 3 impulse, it has occurred too early. As a result and since no de-gating pulse is being generated when the pulse 120 occurs, the coincidence tube 47 is rendered conductive by the improperly-positioned transition between the No. 2 and the No. 3 impulses, and the neon lamp 57 associated therewith will be energized to indicate that distortion is present in the No. 3 impulse. Also, registering counters can be connected to the cathodes of the coincidence tubes 45 to 50, inclusive, to provide a permanent record of the energization of these tubes. Since the particular element in the incoming signal which is faulty is known at a glance, corrective measures can be taken in the structure which causes the generation of this particular element so that the trouble can be found and corrected rapidly.

With the above-described structure, the fact that distortion is present in a particular signal element can be determined. In order to determine the precise amount of distortion present in a signal impulse, a variable resistor 125 associated with the monostable flip-flop range tube 25 is varied initially to place the occurrence of the transition between the start-pulse and the No. 1 intelligence impulse in the center of the first negative pulse from the de-gating pulse amplifier 35. This signal transition is represented by the numeral 126 in FIG. 5–b, and the first de-gating pulse is represented by the numeral 127 in FIG. 5–e. When so positioned, a tap on a variable resistor 130 in the circuit of the de-gating univibrator 35 will be set at a "0%" calibration marker on a scale (not shown) associated therewith. The resistor 130 and a capacitor 131 determine the period of the monostable flip-flop 35. Consequently, if an indicator of the group 55 to 60, inclusive, is energized during each cycle of operation, the variable resistor 130 can be varied until coincidence occurs between the corresponding pulses of FIGS. 5–b and 5–e, after which time the indicator will not be energized. The calibrated scale associated with the resistor 130 can then be read to determine the exact percentage of distortion in the associated, faulty signal impulse.

It is to be understood that the above-described arrangements and construction of elements are simply illustrative of the invention, and many other modifications may be made without departing from the invention.

What is claimed is:

1. A distortion signal indicator which comprises a coincidence-sensing means associated with each element in the signal, means for conditioning each coincidence sensing means for operation at any time during an interval equal to that of a distortionless version of the signal element associated therewith, first pulse generating means responsive to the signal for providing a pulse at the time of each transition in the signal, second pulse generating means responsive to the signal for providing a pulse at the time for each transition of a distortionless version of the signal, means for applying the pulses from the two pulse generators to all coincidence-sensing means simultaneously, the pulse from the first generator operating the conditioned coincidence-sensing means upon the non-coincident occurrence of the pulses from the two generators and the pulse from the second generator preventing such operation of the conditioned coincidence-sensing means upon the coincident occurrence of the pulses from the two generators, and an indicating means connected to each coincidence-sensing means and energized by the operation thereof.

2. A signal distortion indicator for analyzing distortion in each impulse of a telegraph signal, which comprises a distributor having a plurality of serially-connected stages associated with the impulses in the signal, means controlled by the signal for driving the distributor stages sequentially such that each stage is operated for a time duration equal to the duration of the associated impulse in a distortionless version of the signal, a first pulse generator operated by the distributor-driving means for generating a plurality of voltage pulses which occur at the times of transitions between impulses in a distortionless version of the signal, a second impulse generator operated by each transition in the signal for generating a plurality of voltage pulses which occur at the time of the actual transitions between the impulses, a plurality of coincidence-sensing means, means for applying an output voltage from each distributor stage upon its operation to one of the coincidence-sensing means to condition the coincidence-sensing means and for applying outputs from the two pulse generators to all of the coincidence-sensing means simultaneously, and an indicator connected to each coincidence-sensing means and operable upon the non-coincidence of the voltages generated by said impulse generators and applied to said conditioned coincidence-sensing means.

3. Apparatus for indicating distortion in each impulse of a telegraph signal, which comprises a distributor having a plurality of serially-connected stages wherein each stage is associated with one of the impulses in the signal, means for rendering the distributor stages operative successively for a time equal to the length of an impulse in a distortionless version of the signal, a plurality of coincidence-sensing stages, means for connecting each coincidence-sensing stage to one of the distributor stages to condition the coincidence-sensing stages for conduction successively, a first pulse generator operated by the means for rendering the distributor stages operative for providing a pulse each time a transition in the distortionless version of the signal occurs, a second pulse generator operated by the signal for providing a pulse each time a transition in the signal actually occurs, means for applying the pulses from the first and second pulse generators to the coincidence-sensing stages so that the pulse from the second pulse generator will operate any conditioned-sensing stage should the pulses not occur simultaneously, and so that the pulse from the first pulse generator will prevent such operation should the pulses occur simultaneously, and indicating means conected to each coincidence- sensing stage and energizable by the operation of such stage.

4. Apparatus for analyzing distortion in individual impulses in a telegraph signal having a plurality of impulses including a start impulse, which comprises a distributor including a plurality of serially-connected stages wherein each of the stages is associated with one of the impulses of the signal, a first monostable flip-flop operated by the start impulse transition of the signal for generating an output pulse an interval after the start impulse transition equal to one-half the duration of a distortionless start impulse, an oscillator for generating output pulses having a period equal to an impulse length of a distortionless version of the signal to be analyzed, means for applying the oscillator output pulses to the distributor stages to render such stages conductive successively, means including the distributor stages associated with the start impulse and operated by the output pulse of the first monostable flip-flop for rendering the oscillator effective, a second monostable flip-flop which is operated by each output pulse of the oscillator for generating a plurality of output pulses which occur at the time that the transitions in the distortionless signal should occur, a pulse generator operated by the signal for providing an output pulse at the time that each transition in the signal actually occurs, a plurality of coincidence tubes with each tube being associated with a stage of said distributor, means for applying successively an output from each of the distributor stages to its coincidence tube to condition the tube for operation and for applying simultaneously the outputs from the second monostable flip-flop and the pulse generator to all of the coincidence tubes, and means connected to the output of each coincidence tube for indicating non-coincidence of the outputs of the second monostable flip-flop and the pulse generator at a coincidence tube conditioned for operation by the associated distributor stage.

5. An indicator for analyzing distortion in transitions between the start intelligence and stop elements of a telegraph signal, which comprises a distributor having a plurality of serially-connected stages wherein each stage is associated with one of the elements of the signal, a first monostable flip-flop having a period which is equal to one-half the length of a distortionless start element, means for applying the signal to the first monostable flip-flop to provide an effective output pulse at the end of the period of the first flip-flop, means for applying the output pulse from the first monostable flip-flop to the distributor stage associated with the start element to operate such stage, an oscillator having a period which is equal to the length of a distortionless signal element, means operated by the distributor stage associated with the start element for rendering the oscillator effective to provide a plurality of output pulses, means for applying the oscillator output pulses to the distributor stages to operate such stages successively, a second monostable flip-flop for providing a de-gating pulse each time it is operated, means energized by the oscillator output pulses for operating the second monostable flip-flop to provide therefrom a de-gating pulse which occurs at a time at which each transition between elements in a distortionless signal should occur, a pulse source operated by the signal for providing an operating pulse which occurs at a time at which each transition between the elements in the signal actually occurs, a plurality of coincidence tubes wherein each has an input electrode connected to a different one of the stages of the distributor to cause the coincidence tubes to be conditioned for operation successively by the output of the stages upon their operation in a distributor sequence, means for applying the de-gating pulses and the operating pulses from the pulse source to another input electrode of all coincidence tubes simultaneously, the operating pulses rendering any conditioned coincidence tube conductive should no de-gating pulse occur coincidentally therewith but being ineffective to render the conditioned coincidence tube conductive upon the coincident occurrence therewith of a de-gating pulse, and an indicator connected to an output electrode of each coincidence tube and energized by the associated coincidence tube upon occurrence of conductivity therein.

6. Apparatus for indicating distortion in each impulse of a telegraph signal, which comprises a distributor having a plurality of serially-connected stages wherein each stage is associated with one of the impulses in the signal, means for rendering the distributor stages operative successively for a time equal to the length of an impulse in a distortionless version of the signal, a plurality of coincidence-sensing stages, means for connecting each coincidence-sensing stage to one of the distributor stages to condition the coincidence-sensing stages for conduction successively, a first pulse generator operated by the means for rendering the distributor stages operative for providing a pulse each time a transition in the distortionless version of the signal occurs, a second pulse generator operated by the signal for providing a pulse each time a transition in the signal actually occurs, means for applying the pulses from the first and second pulse generators to the coincidence-sensing stages so that the pulse from the second pulse generator will operate any conditioned-sensing stage should the pulses not occur simultaneously, and so that the pulse from the first pulse generator will prevent such operation should the pulses occur simultaneously, and indicating means connected to each coincidence-sensing stage and energizable by the operation of such stage, and means for varying the time of occurrence of the first pulse generated to bring it into coincidence with the second pulse.

References Cited in the file of this patent
UNITED STATES PATENTS

| | | |
|---|---|---|
| 2,435,258 | Wilder | Feb. 3, 1948 |
| 2,619,542 | Carver | Nov. 25, 1952 |
| 2,856,457 | Prior et al. | Oct. 14, 1958 |

FOREIGN PATENTS

| | | |
|---|---|---|
| 735,117 | Great Britain | Aug. 17, 1955 |